Oct. 7, 1952 J. D. HEIBEL 2,613,252

ELECTRIC CIRCUIT AND COMPONENT

Filed Sept. 23, 1947 9 Sheets-Sheet 1

Inventor

Jerome D Heibel

By Ralph Hammar

Attorney

Inventor
Jerome D. Heibel
By
Ralph Hammar
Attorney

Oct. 7, 1952 J. D. HEIBEL 2,613,252

ELECTRIC CIRCUIT AND COMPONENT

Filed Sept. 23, 1947 9 Sheets-Sheet 3

Inventor

Jerome D Heibel

Ralph Hammar

Attorney

Oct. 7, 1952 J. D. HEIBEL 2,613,252

ELECTRIC CIRCUIT AND COMPONENT

Filed Sept. 23, 1947 9 Sheets-Sheet 4

Inventor

Jerome D. Heibel

By

Ralph Hammar

Attorney

Oct. 7, 1952 J. D. HEIBEL 2,613,252

ELECTRIC CIRCUIT AND COMPONENT

Filed Sept. 23, 1947 9 Sheets-Sheet 5

Inventor

Jerome D. Heibel

Ralph Hammar

Attorney

Oct. 7, 1952 J. D. HEIBEL 2,613,252

ELECTRIC CIRCUIT AND COMPONENT

Filed Sept. 23, 1947 9 Sheets-Sheet 6

Inventor

Jerome D. Heibel

By Ralph Hammar

Attorney

Oct. 7, 1952 J. D. HEIBEL 2,613,252

ELECTRIC CIRCUIT AND COMPONENT

Filed Sept. 23, 1947 9 Sheets-Sheet 7

Inventor
Jerome D Heibel
Ralph Hammar
Attorney

Oct. 7, 1952 J. D. HEIBEL 2,613,252

ELECTRIC CIRCUIT AND COMPONENT

Filed Sept. 23, 1947 9 Sheets-Sheet 8

Inventor
Jerome D. Heibel
By Ralph Hamman
Attorney

Oct. 7, 1952 J. D. HEIBEL 2,613,252

ELECTRIC CIRCUIT AND COMPONENT

Filed Sept. 23, 1947 9 Sheets-Sheet 9

Jerome D Heibel
INVENTOR

BY Ralph Hammar
ATTORNEY

Patented Oct. 7, 1952 2,613,252

UNITED STATES PATENT OFFICE 2,613,252

ELECTRIC CIRCUIT AND COMPONENT

Jerome D. Heibel, Erie, Pa., assignor to Erie Resistor Corporation, Erie, Pa., a corporation of Pennsylvania Application September 23, 1947, Serial No. 775,649

18 Claims. (Cl. 175—298)

This invention is intended to simplify the manufacture of electric circuits and components. In one form circuit elements are assembled on a metal grid having portions forming the terminals and circuit interconnections; and homogeneous plastic is then molded around the assembly. In another form the elements are sandwiched between sheets of plastic or plastic impregnated insulating material. The circuit interconnections may be made by a metal grid contacting the elements. Upon molding under pressure to consolidate the sheets, the elements are firmly located and held in pressure contact with the grid. The metal grid and the insulating material may be in strip form. The metal grid may be a coating applied to the insulating material. The versatility may be increased by including extra circuit interconnections in the grid and eliminating the unwanted interconnections either before or after molding.

Complete circuits, sub-assemblies such as resistor-condenser networks, or components such as tube sockets may be made. Common advantages are the elimination of soldered connections and adaptability to automatic or semi-automatic assembly. Further objects and advantages appear in the specification and claims.

Figure 1:
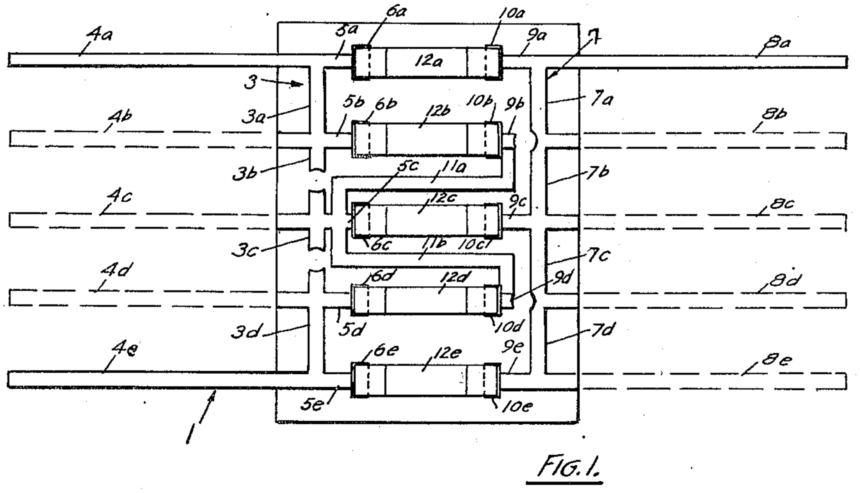
Figure 2:
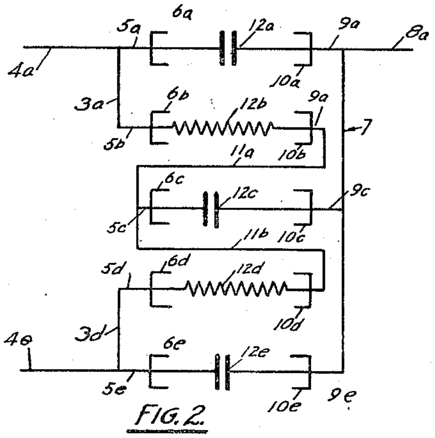
Figure 3:
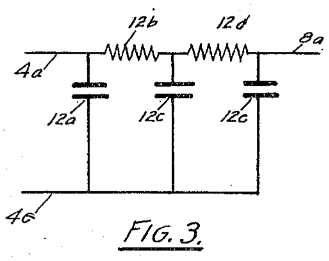
Figure 9A:
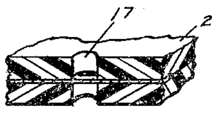
Figure 4:
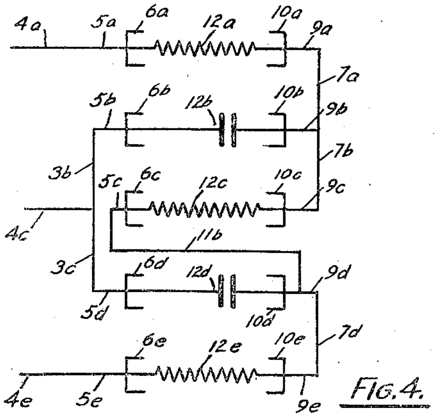
Figure 5:
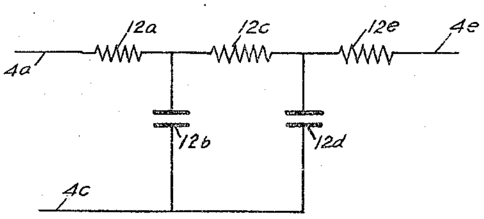
Figure 6:
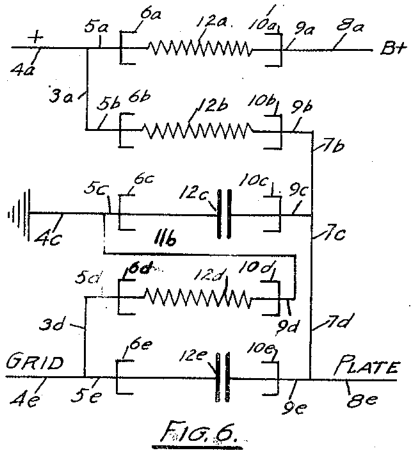
Figure 7:
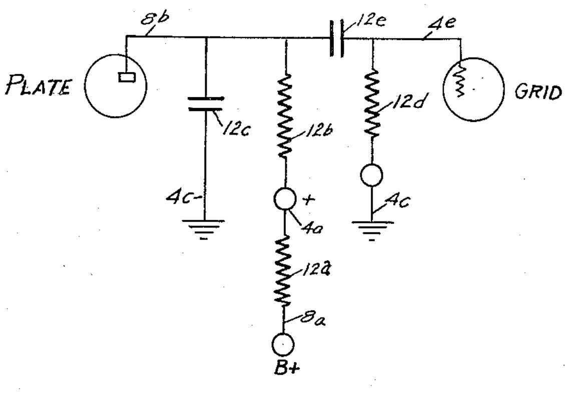
Figure 8:
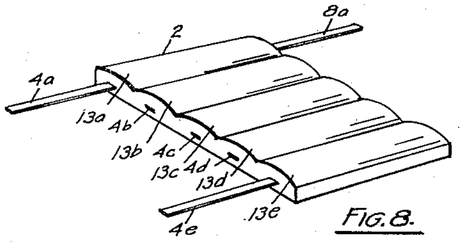
Figure 9:
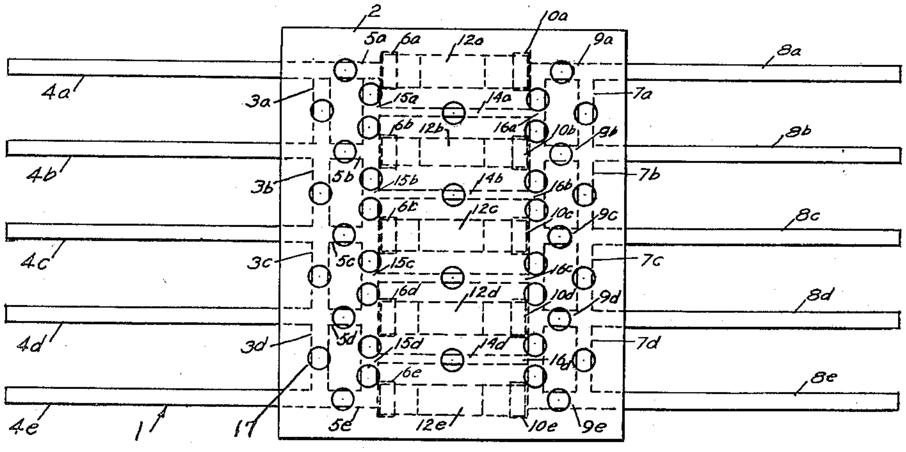
Figures 10, 11, 12, 13, 17A:
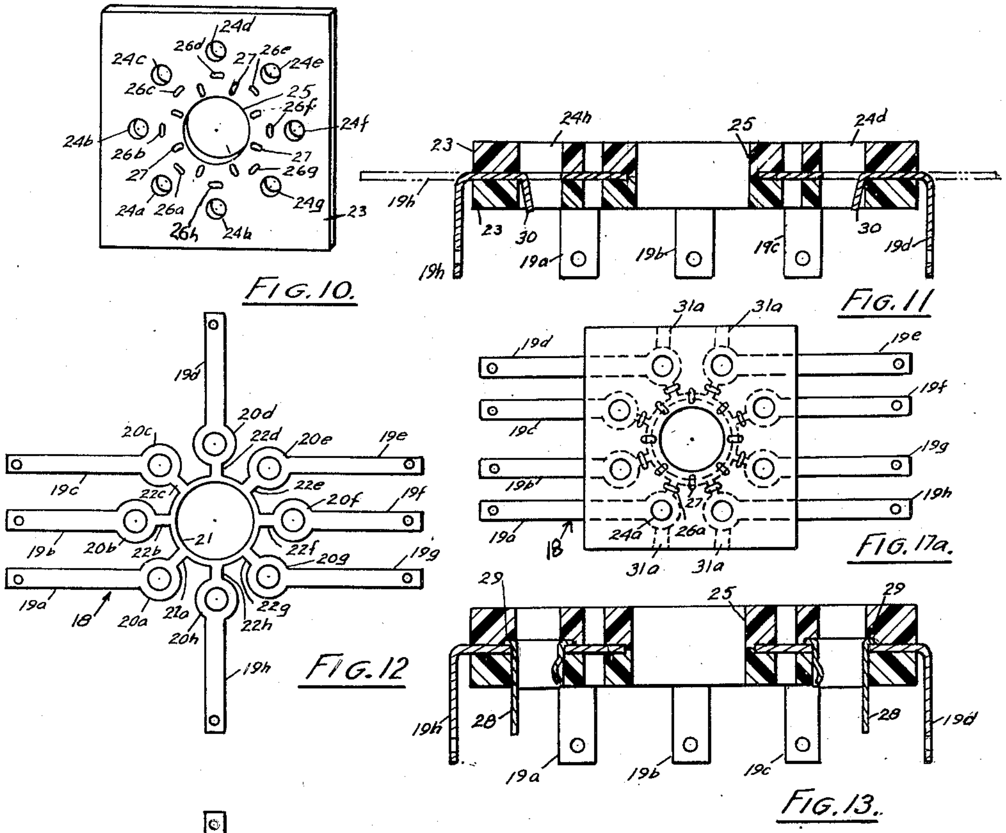
Figure 14:
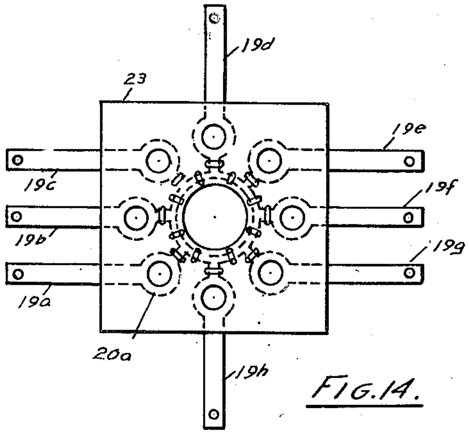
Figure 15:
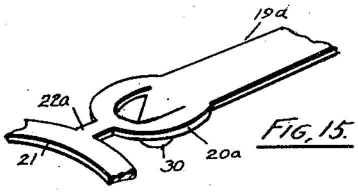
Figure 16:
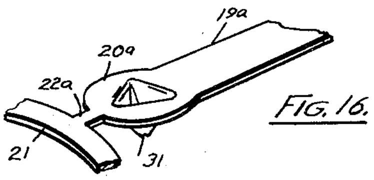
Figure 17:
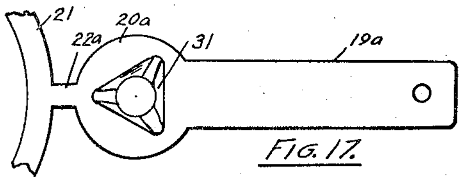
Figure 18:
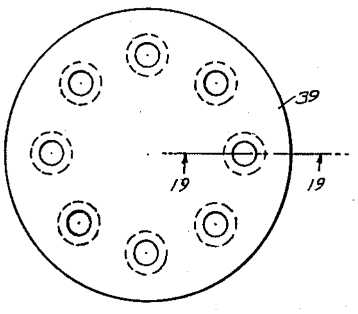
Figure 19:
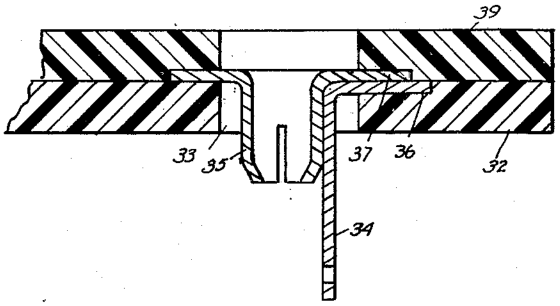
Figure 20:
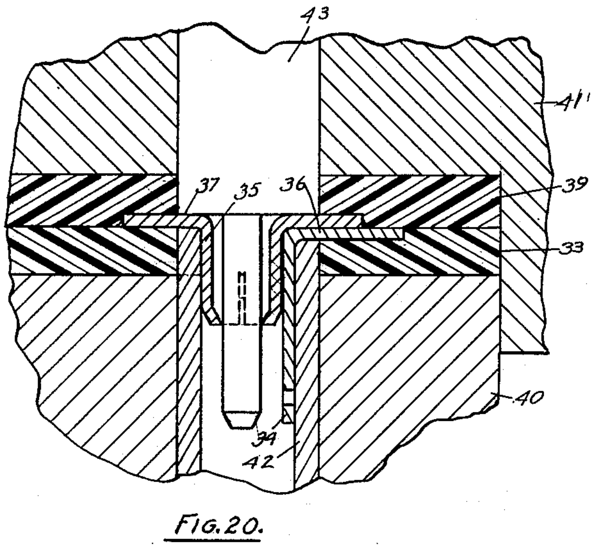
Figure 21:
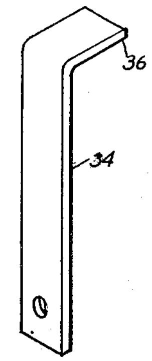
Figures 22, 23:
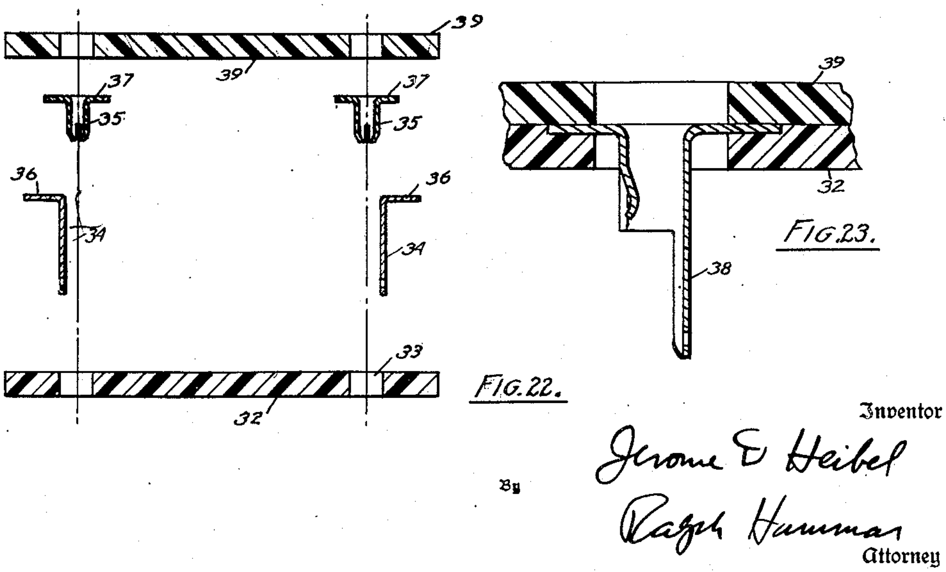
Figure 2A:
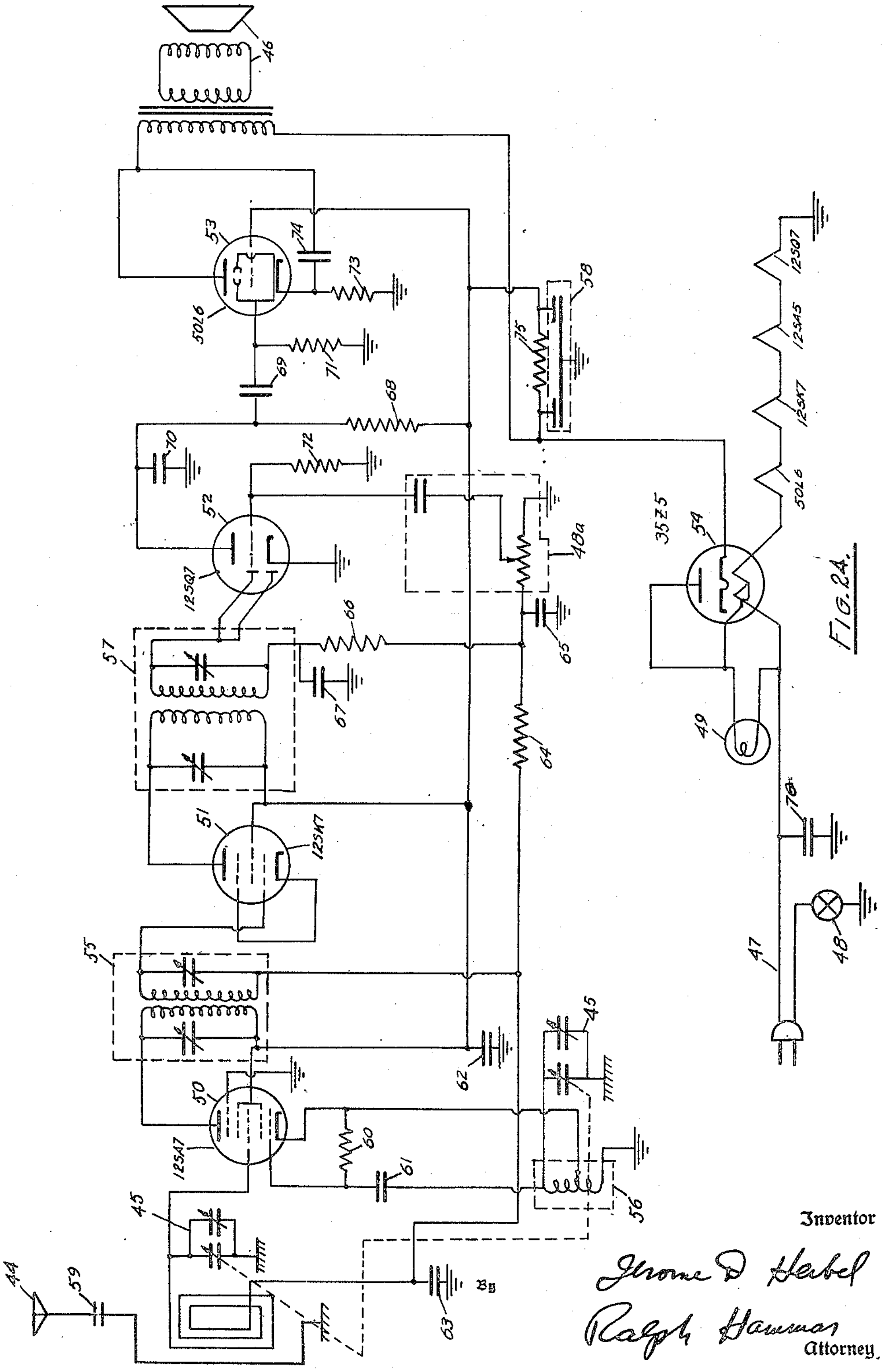
Figure 25:
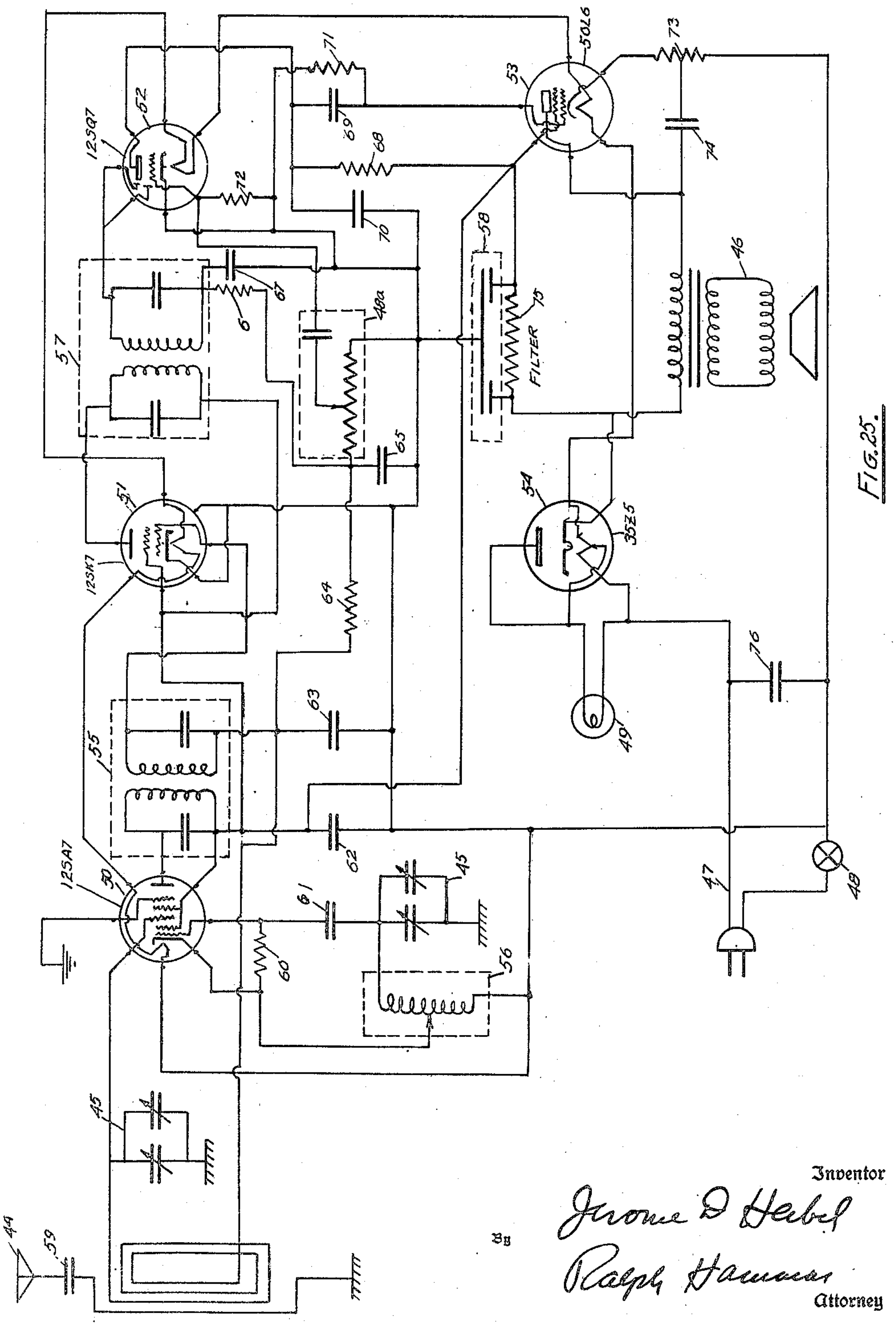
Figure 26:
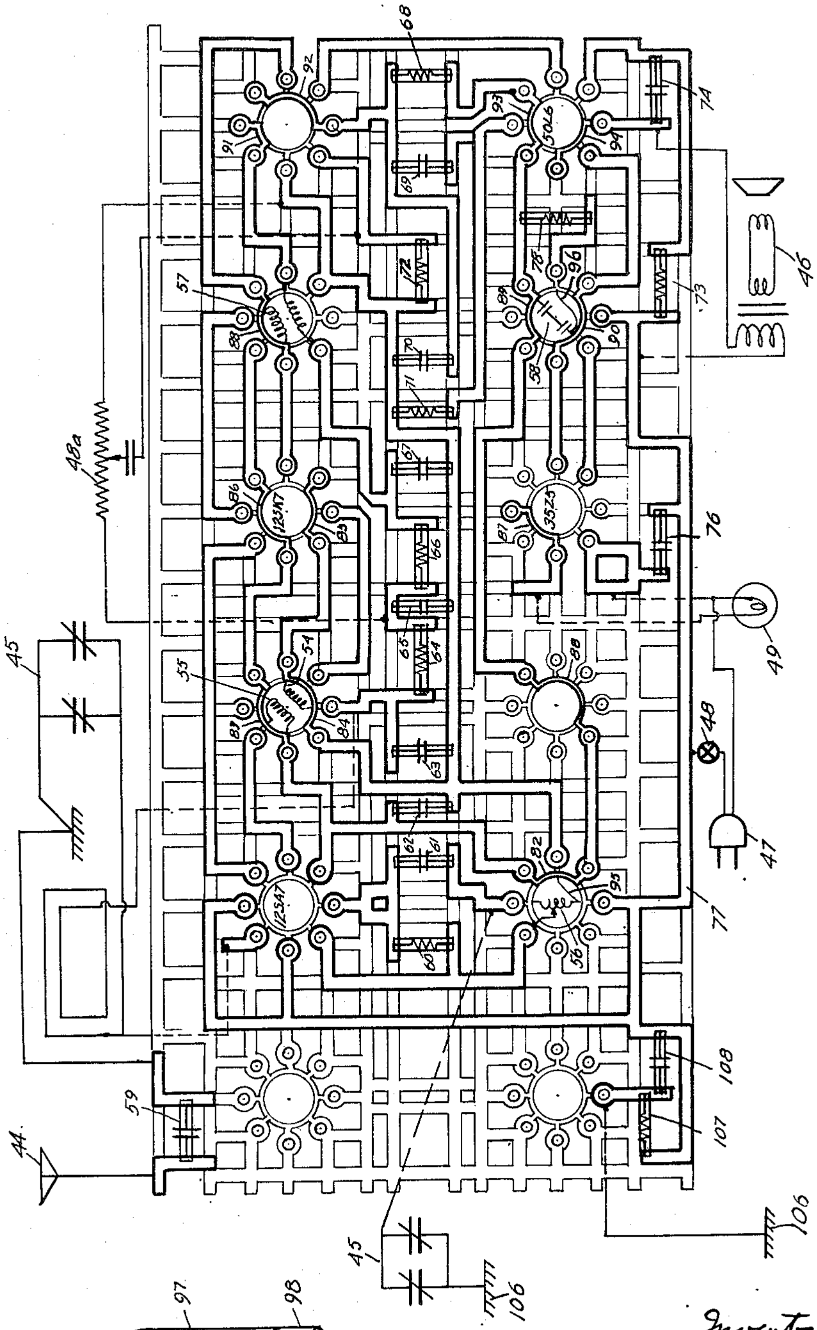
Figure 27:
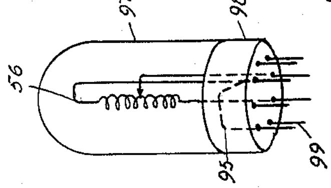
Figure 29:
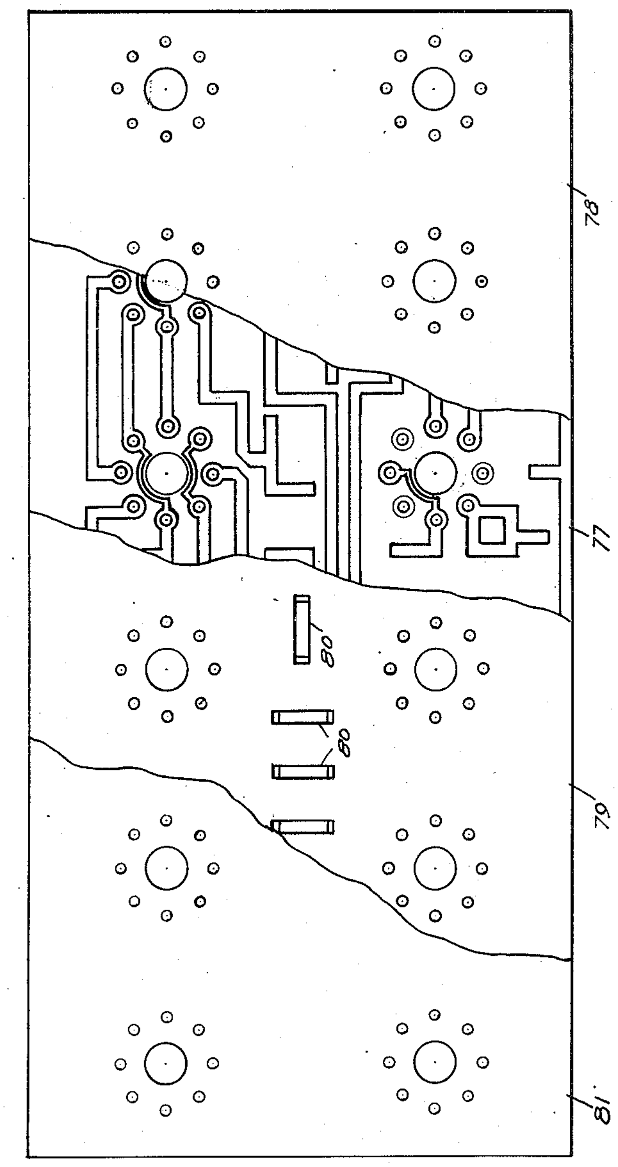
Figure 30A:
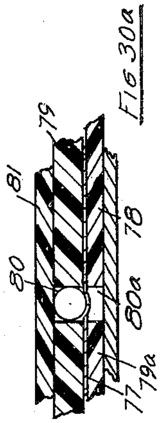
Figure 30:
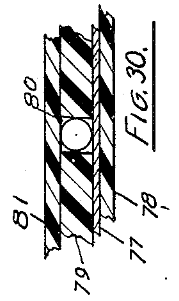
Figure 28:
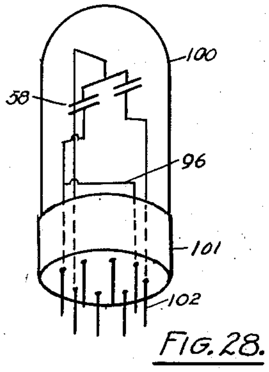
Figure 31:
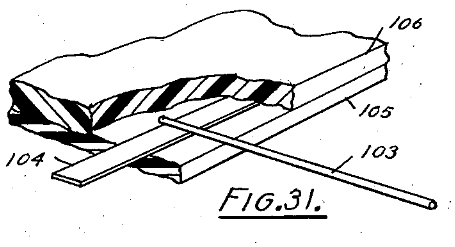
Figure 33:
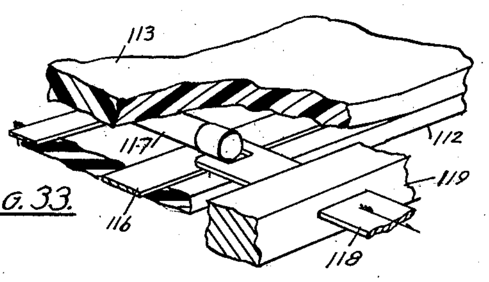
Figure 32:
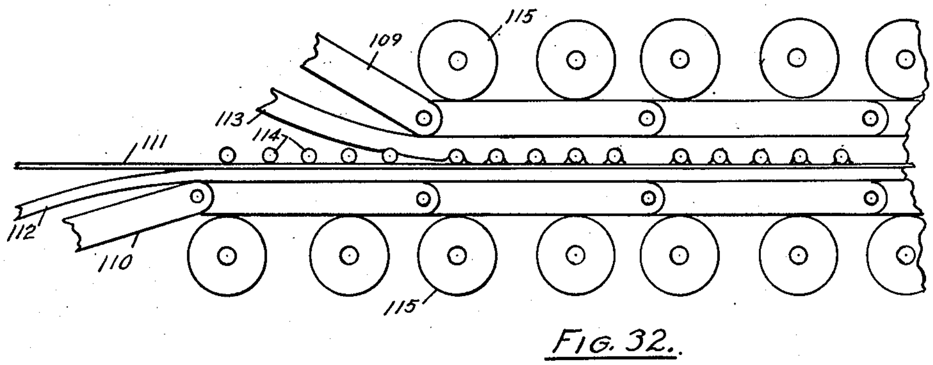
Figure 34:
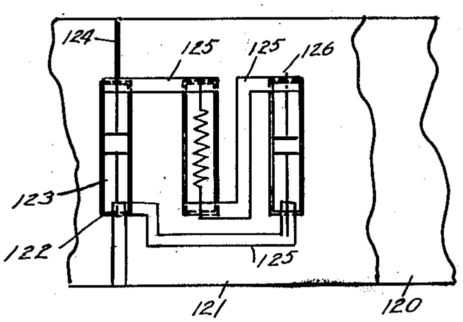

In the drawings, Fig. 1 is a diagrammatic plan view of a $\pi$ network in which the circuit elements and circuit interconnections are molded in plastic; Fig. 2 is a line diagram and Fig. 3 is the conventional electric circuit diagram for the Fig. 1 network; Fig. 4 is a line diagram and Fig. 5 is a conventional electric circuit diagram of a T network; Fig. 6 is a line diagram and Fig. 7 is a conventional electric circuit diagram of an amplifier coupling network; Fig. 8 is a perspective of the Fig. 1 network; Fig. 9 is a diagrammatic plan view of a modification permitting a greater variety of circuit interconnections; Fig. 9*a* is a fragmentary perspective of one of the knockout holes for breaking an unwanted connection after molding; Fig. 10 is a perspective view of a blank of insulating material for a tube socket; Fig. 11 is a section through the tube socket; Fig. 12 is a plan view of a mesh forming the socket terminal pin contacts and circuit interconnections; Fig. 13 is a section through a socket having a modification of the pin contact construction; Fig. 14 is a plan view of the socket; Fig. 15 is a fragmentary perspective of the pin contact construction used in the Fig. 11 socket; Figs. 16 and 17 show another modification of the pin contact construction; Fig. 17*a* is a plan view of a socket adapted to manufacture in strips containing a plurality of sockets;

Fig. 18 is a top view of another laminated tube socket; Fig. 19 is a fragmentary section through one of the pin contacts; Fig. 20 is a fragmentary section through the mold; Fig. 21 is a perspective of one of the socket terminals; Fig. 22 is an exploded view showing the assembly; Fig. 23 is a fragmentary section through a pin contact having an integral terminal; Fig. 24 is a circuit diagram of a typical radio receiving set; Fig. 25 is a diagram of the Fig. 24 set with the parts rearranged so the chassis may be conveniently molded; Fig. 26 is a phantom view of the molded chassis; Fig. 27 is a phantom perspective of one of the plug in coils for the chassis; Fig. 28 is a phantom perspective of the plug in condensers for the chassis; Fig. 29 is a plan view partly broken away of the molded chassis; Fig. 30 is a section through one of the resistors or condensers molded in the chassis; Fig. 30*a* is a view similar to Fig. 30 of a modification; Fig. 31 is a fragmentary view illustrating a terminal connection; Fig. 32 is a side elevation showing continuous strip manufacture of the Fig. 1–9 circuit elements; Fig. 33 is a fragmentary view showing an arrangement for dispensing with clips for the circuit elements; and Fig. 34 is a fragmentary plan view, partly broken away, of a construction in which the terminals and circuit interconnections are applied to the outer surface of the insulating material.

Figs. 1 through 8 show various forms of a circuit component consisting of networks of resistors and condensers having wide application, for example, in radio circuits. Each of these networks utilize a metal mesh 1, which is generally in the form of a sheet and may be a stamping, to provide the network terminals, the contacts for the circuit elements (the resistor and condensers) and the circuit interconnections. The same mesh is usable in each network by eliminating the unwanted terminals and circuit interconnections. Each network is embedded in a body 2 of free flowing homogeneous molded plastic which seals and holds the parts in fixed relation. The plastic also prevents disturbance of the contact to the condensers and resistors. No soldered connections are necessary in the portion of the network embedded in the plastic.

The metal mesh has at one end a continuous bus 3 having portions of its length labeled **3*a*, 3*b*, 3*c*, 3*d*. From the outer side of the bus extend terminals 4*a*, 4*b*, 4*c*, 4*d*, 4*e*, and from the inner side of the bus extend leads 5*a*, 5*b*, 5*c*, 5*d*, 5*e*, terminating in clips 6*a*, 6*b*, 6*c*, 6*d*, 6*e*. At the other end of the mesh is a continuous bus 7 parallel to the bus 3** and having portions of its length labeled 7a, 7b, 7c, 7d. From the outer side of the bus 7 extend terminals 8a, 8b, 8c, 8d, 8e, and from the inner side of the bus extend leads 9a, 9b, 9c, 9d, 9e, terminating in clips 10a, 10b, 10c, 10d, 10e. The correspondingly lettered terminals, leads, clips and bus sections are directly opposite each other. Additional circuit interconnections are provided by bridging or crossover connections 11a, 11b, extending from the inner ends of leads 9b, 9d, to the inner end of lead 5c.

The mesh described contains more terminals and circuit interconnections than necessary for any particular network. The unwanted terminals and circuit interconnections may be eliminated either before or after molding. If the mesh is blanked from sheet metal the excess or unwanted parts may be eliminated by changing punches in the blanking die.

In the manufacture, the terminals 4a—e and 8a—e are clamped in a holder, condensers and resistors 12a—e are inserted in the clips 6a—e, 10a—e, the holder is inserted in a mold, and the plastic 2 set under pressure around the assembly. The plastic prevents movement of the clips 6a—e, 10a—e, away from the ends of the resistors and condensers 12a—e, making a permanent connection. As shown in Fig. 1, leads 9b, 9d, and bus sections 3b, 3c, are severed prior to molding because these connections are not needed for the particular network. The gripping of the terminals 4a—e, 8a—e, prevents objectionable floating of the resistors and condensers during molding. The location of the resistors and condensers is further aided by using an upper mold producing the scalloped or ribbed upper surface 13a—e shown in Fig. 8. This mold configuration tends to center each of the resistors and condensers 12a—e in the correspondingly lettered rib 13a—e. After molding, the unwanted terminals 4b—d, 8b—e, are broken off.

The network shown in Fig. 1 is a network. Fig. 2 is a line diagram. Fig. 3 shows the conventional electric circuit diagram. The external appearance is shown in Fig. 8. It will be noted that in this network, the terminals 4b, 4c, 4d, 8b, 8c, 8d, 8e, are broken off, and that leads 9b, 9d, and bus sections 3b, 3c, are broken.

Fig. 4 is a line diagram and Fig. 5 is a conventional electric circuit diagram of a network. In this network the terminals 4b, 4d, 8a, 8b, 8c, 8d, 8e, are broken off and the bus sections 3a, 3d, 7c, lead 5c and cross-over connection 11a severed.

Fig. 6 is a line diagram and Fig. 7 is a conventional electric circuit diagram of an amplifier coupling network. In this network the terminals 4b, 4d, 8b, 8c, 8d, are broken off and the bus sections 3b, 3c, 7a, lead 9d, and cross-over connection 11a severed.

Figs. 1–8 sufficiently illustrate the variety of networks which can be made with the same components.

Fig. 9 shows a modification which is basically the mesh 1 with the cross-over connections 11a, 11b, eliminated and cross-over connections 14a, 14b, 14c, 14d, substituted. Each of the cross-over connections 14a—d are connected to the inner ends of leads 5a—e, through correspondingly lettered secondary bus sections 15a—d and to the inner ends of leads 9a—e through correspondingly lettered secondary bus sections 16a—d. The shape of the mesh 9 between any pair of adjacent terminals is the same. This simplifies the fabrication from sheet metal in that the mesh can be blanked by a single die in four punches.

As in the Figs. 1–8 construction, the terminals 4a—e and 8a—e are clamped in a holder, the resistors and condensers 12a—e placed in the clips 6a—e, 10a—e, the holder inserted in a mold, and the body 2 of plastic set under pressure around the assembly.

Instead of breaking the unwanted circuit interconnections before molding, the mold is provided with opposed pins molding holes 17 opposite each place at which it may be desirable to break one of the circuit interconnections. The detail of one of the holes 17 is shown in Fig. 9a. After the molding operation is completed the unwanted connections are punched out through the hole. Breaking the connections after molding simplifies the molding in that the entire mesh forms a rigid structure holding the resistors and condensers in place. The holes 17 can be used with the Figs. 1–8 construction instead of physically breaking the unwanted interconnections before molding.

All of the constructions so far described eliminate a large number of soldered connections and are adapted to automatic or semi-automatic assembly. The condensers and resistors 12a—e can be automatically fed and inserted in the clips.

In Figs. 10–17 is shown a tube socket having a metal mesh 18 provided with terminals 19a—h, pin contact sections 20a—h, and a ring bus 21 connected to the pin contacts by leads 22a—h.

The mesh 18 is sandwiched between two sheets 23 of uncured or semi-cured plastic impregnated insulating material having pin receiving openings 24a—h registering with the pin contact sections 20a—h, a central opening 25 within the ring bus 21, openings 26a—h registering with the leads 22a—h and openings 27 registering with the ring bus 21 between each of the leads. The assembly is then molded under heat and pressure, consolidating the sheets 23.

After molding, the pin terminals and contacts are firmly embedded in insulating material eliminating the possibility of leakage paths between the sheets.

The socket shown in Fig. 17a, while functionally the same as the Figs. 10–17 sockets, is better adapted to molding in long or continuous strips because the mesh 18 is made in strip form, adjacent sections being connected by sections 31a which are sheared midway between their ends after assembly. The terminals 19a—d extend from one side of the strip and the terminals 19e—h extend from the other side of the strip. This rearrangement of the terminals permits closer spacing of the sockets in the strip.

The feature of making the mesh in strip form of identical or similar mesh sections connected by connecting sections to be sheared after assembly can be applied to other circuits and circuit components. For example, in the Fig. 1–9 networks, the connecting sections 31a could extend from the bus sections 3 and 7.

The laminated construction of the insulating material is susceptible of considerable variation. The outer sheets may be hard cured plastic impregnated sheet material adhesively joined by plastic flowing from the sheet material during molding by an intermediate plastic impregnated sheet, or by a plastic coating applied to the mating surfaces of the outer sheets. One or both of the sheets may be felt-like so as to be flowable under the molding pressure. Flowability is advantageous when the laminated construction is applied to networks such as illustrated in Figs. 1–9a where the plastic should flow around the resistors and condensers during the molding.

The ring bus permits one or more interconnections between any two pin contacts, thereby eliminating many external soldered connections. The unwanted connections are either eliminated before molding or punched out after molding through the openings 26a—h and 27. The number of interconnections through the ring bus depends upon the contacts to be connected. One such interconnection is always possible—two usually possible—more sometimes possible. The ring bus facilitates assembly by tying the terminals together so the mesh can be more easily assembled between the sheets 23.

A variety of pin contact constructions are available. As shown in Fig. 13, separate pin contacts 28 may be dropped through holes in the contact sections 20a—h. These contacts have flanges 29 overlying the contact sections which after molding are held in firm pressure contact. In Fig. 15 a pin engaging finger or tab 30 is struck out of the contact section. In Fig. 16 a triangular punch presses the contact section forming three pin contact fingers 31.

In Figs. 18–23 is shown another tube socket in which the pin contacts are anchored in consolidated sheets of plastic impregnated insulating material. As indicated in Fig. 22, a lower sheet 32 of plastic impregnated insulating material has pin receiving openings 33 into which are dropped terminals 34 and pin contacts 35. The terminals 34 and the pin contacts 35 have flanges 36 and 37 projecting outside the openings 33. The terminals and contacts may be combined as indicated at 38 in Fig. 23. In either case, the contacts and terminals are adapted to automatic assembly into the sheet 32. The sheet 32 with the assembled pin contacts and terminals and a registering sheet 39 are placed in a mold 40, 41 and cured under heat and pressure, as shown in Fig. 20. The pin contacts may be centered in the openings 33 by sleeves 42 in the mold part 40, pins 43 in the mating mold part 41 or both. The pins and sleeves prevent the squeezing of a flash of plastic impregnant into the openings 33 during molding although the flash is usually not large enough to be objectionable.

After molding, the pin contacts 35 or 38 are in effect inserts securely held in the plastic by the embedded flanges. Also the flanges 36 and 37 are firmly held in pressure contact. Because the sheets are consolidated intermediate the pin contacts there are no leakage paths between the sheets.

No attempt has been made to illustrate all of the sockets to which the laminated construction of Figs. 10–23 is applicable or to illustrate other metal parts such as the center locking ferrule which may be assembled in the same manner as the pin contacts.

In Figs. 24–29 is shown a complete radio chassis in which the sockets, resistors, and condensers, and the circuit interconnections are a single molded unit.

Fig. 24 is a circuit diagram for a typical 5 tube radio set in which 44 indicates the antenna, 45 the gang tuning condenser, 46 the loud speaker, 47 the cord set, 48 the power switch, 48a the volume control, and 49 the pilot light. These are parts external to the chassis which comprises tubes 50, 51, 52, 53, 54, coils 55, 56, 57, power supply filter condensers 58, and various resistors and condensers 59–76 inclusive.

Fig. 25 is as Fig. 24 redrawn to correspond with the physical arrangement of Fig. 26 which shows a complete chassis using a general purpose mesh 77, the unused portions of which are shown in light line. The mesh 77 (as shown in the fragmentary view Fig. 29) is laid on one face of a sheet 78 of plastic impregnated insulating material and an overlying sheet 79 having openings 80 receiving the condensers and resistors is placed on top of the sheet 78. The condensers and resistors are then dropped in the openings and a covering sheet 81 placed on the assembly. After molding, the sheets 77, 78 and 81 are consolidated. As in the previously described constructions the mesh is held in the plastic and a pressure contact established with the ends of the condensers and resistors and the interconnecting or bus sections of the mesh. The top sheet 81 is preferably felt-like so that under molding pressure it can flow around and relieve the crushing pressure on the resistors and condensers. The possibility of flow under molding pressure is not essential for the bottom sheet 78 and the intermediate sheet 79.

The mesh 77, instead of being a sheet metal stamping, may be a metallic or metallized coating applied to the bottom sheet 78, in which case it would probably be preferable to apply only the wanted portions of the mesh.

Another arrangement for relieving the crushing pressure on the resistors and condensers during molding is shown in Fig. 30a where a sheet 79a underlies the mesh 77 and has openings 80a registering with the openings 80. Under molding pressure, the portions of the mesh 77 in contact with the resistors and condensers bow downward into the openings 80a and relieve the crushing pressure on the resistors and condensers while still maintaining ample contact pressure. In the Fig. 30a arrangement it is not necessary that any of the sheets 78, 79, 79a, 81 be felt-like.

The tube sockets formed in the same manner as the socket shown in Figs. 10–17 are used for the tubes and also to plug in coils and condensers 55, 56, 57, 58. The pin receiving openings in the tube sockets which register with similar openings in the sheets 78, 79 and 81 can cooperate with locating pins in the mold similar to those illustrated at 43 in Fig. 20 so as to maintain the desired register during molding. As in the Figs. 10–17 socket, there is an inner ring bus, sections of which may be used for cross-over connections between the pin contacts. The sections used for such cross-over connections are shown in heavy lines and indicated by the reference numerals 82, 83, 84, 85, 86, 87, 88, 89, 90, 91, 92, 93, 94.

Other cross-over connections may be provided between the terminals of the plug in coil and condensers 55, 56, 57, 58. In the particular circuit illustrated it was found convenient to provide a cross-over connection 95 in the plug in coil 56 and a cross-over connection 96 in the plug in condensers 58.

Fig. 27 is a perspective of the coil 56. The coil is mounted in a case 97 carried on a base 98 having pin contacts 99. The cross-over connection 95 is connected between two of the pin contacts. Fig. 28 is a perspective view of the plug in condensers 58 which are likewise mounted in a case 100 carried on a base 101 having pin contacts 102. The cross-over connection 96 is arranged between two of the pin contacts.

There are a variety of expedients for connecting the external components 44—49 to the chassis. Fig. 31 is a fragmentary perspective of the pressure connection of a terminal 103 to a bus section 104. The terminal wire is merely laid on the bus section 104 and is molded in pressure contact with the bus section between adhesively joined sheets 105 and 106 of insulating material. The molding pressure is relied upon to establish the contact. The flow of insulating material around the lead maintains the contact at the completion of the molding operation. This expedient is adapted to making connections to bus sections on the outer part of a mesh. It is not only applicable to the radio chassis shown in Fig. 26 but also to the socket shown in Figs. 10–17 and the network shown in Figs. 1–9. Another expedient for making connections to the mesh is shown in Fig. 19. A contact such as the contact 35 may be dropped through an opening in a bus section or may be located beside a bus section so that its flange 37 overlaps the bus section. Upon consolidation of the sheets of insulating material during molding, a permanent pressure connection is established between the flange 37 and the underlying bus section. This results in the creation of a plug in contact for making connection with an external element.

The molded radio chassis is preferably supported on a metal framework diagrammatically indicated at 106. In order to establish a stable ground potential for the radio chassis this metal framework is connected to the portion of the mesh serving as the ground circuit through a resistor 107 and a condenser 108 which are molded into the chassis.

Fig. 32 is a side view diagrammatically illustrating the continuous molding of the networks shown in Figs. 1–9. The molds for forming the individual networks comprise upper and lower hinged sections 109, 110, each hinged section being of a length to mold one network. This is one form of a continuous chain or belt arrangement of the molds. The mesh is fed in the form of a continuous strip 111 between a lower semi-rigid strip 112 of plastic impregnated insulating material and an upper felt-like strip 113 of plastic impregnated insulating material. The resistors and condensers 114 are suitably located on the mesh. The mold sections 109 and 110 are passed between heated pressure rolls 115 which press the mold sections together causing a flowing of the material of the strip 113 around the condensers and resistors 114 and also establishing pressure contact between the resistors and condensers and the mesh.

In Fig. 33 is diagrammatically shown an arrangement for locating resistors or condensers with respect to a bus section during the molding operation and thereby to dispense with the need for clips. In this view, 116 illustrates a bus section to which a resistor or condenser 117 is to be connected. Prior to molding the resistor or condenser is positioned over the bus section by a retractable finger 118 carried in an end section 119 of the mold. As the upper and lower mold sections are squeezed together the pressure exerted by the molded material on the resistor or condenser both establishes the pressure contact and holds the resistor or condenser in the desired location relative to the bus section. The amount of the locating and contact establishing pressure is substantially less than the full molding pressure. As soon as this locating or contact establishing pressure is reached the finger 118 is retracted and the molded material flows to fill the space formerly occupied by the finger.

In Fig. 34 is shown a modification of the laminated construction with the terminals and circuit interconnections applied as metallic or metalized coatings. In this modification there is a bottom strip 120 and a top strip 121 of plastic impregnated insulating material consolidated or molded to a unitary strip. Obviously the strip may be of homogeneous rather than laminated construction. In the top strip 121 are openings 122 receiving resistors and condensers 123. The depth of the openings (or recesses) is substantially the diameter of the resistors and condensers. In the manufacture, the strips 120, 121 are consolidated (or are equivalent unitary strip manufactured), the resistors and condensers 123 are dropped into the openings 122, and the desired terminals 124 and circuit interconnections 125 are sprayed or otherwise applied to the upper surface of the strip 121. The conducting coating at 126 fills in the space between the ends of the resistors and condensers and the openings or recesses 122 both making contact with the resistors and condensers and adhesively securing the resistors and condensers in the openings. In connection with Fig. 29 there has been described a construction in which the terminals and circuit interconnections were applied to a sheet equivalent to the sheet 120 and did not have the added function of holding the resistors and condensers in place.

What I claim as new is:

1. In an electric circuit, a general purpose mesh for assembly of previously manufactured leadless circuit elements each having a body with terminal surfaces at the ends of the body, said mesh having a bus, terminals extending from one side of the bus, leads extending from the other side of the bus to a second bus, means including contacts on the second bus for receiving and holding in electric connecting relation the terminal surfaces of the leadless circuit elements, and cross-over connections to the second bus intermediate the contacts.

2. A radio chassis comprising a metal mesh having a plurality of sets of socket contacts for receiving the pins of plug-in bases carrying tubes and other electric circuit components, an arcuate bus section radially within and providing a cross-over connection between at least two contacts of one set of socket contacts, and bus sections radically outside of the sets of socket contacts interconnecting the contacts of different sets of socket contacts, and sheets of insulating material on opposite faces of the mesh adhesively joined under pressure and having pin openings registering with the socket contacts.

3. A radio chassis comprising a metal mesh having a plurality of sets of socket contacts for receiving the pins of plug-in bases carrying tubes and other electric circuit components, an arcuate bus section radially within and providing a cross-over connection between at least two contacts of one set of socket contacts, and bus sections radially outside of the sets of socket contacts interconnecting the contacts of different sets of socket contacts, unitary previously manufactured leadless circuit elements having terminal surfaces loosely engaging the bus sections, structure for holding the terminal surfaces of the circuit elements in temporary engagement with the bus sections, and sheets of insulating material on opposite faces of the mesh adhesively joined under pressure and holding the terminal surfaces circuit elements in engagement with the bus sections, and pin receiving openings in the sheets registering with the socket contacts.

4. In an electric circuit, a member of insulating material having in one surface recesses loosely receiving leadless circuit elements, each comprising a body having at its ends terminal surfaces for making electrical connection to the element, said terminal surfaces being located in said recesses, and an adherent conducting coating applied to said one surface of the member of insulating material and between the terminal surfaces of the circuit elements and the recesses providing circuit interconnections between the elements and securing the elements in the recesses.

5. In an electric circuit containing a plurality of unitary independently manufactured circuit elements such as resistors and condensers and circuit interconnections between the elements, a metal mesh generally in the form of a sheet and containing terminals for external connection of the circuit, clips for receiving the terminals of unitary independent circuit elements and circuit interconnections between the mesh terminals and clips, the circuit interconnections including those necessary for a plurality of different circuits whereby some of the interconnections are unwanted for any particular circuit, separately manufactured circuit impedance elements having terminals making frictional electric contact with the clips, flowable plastic molded around and embedding the mesh and elements and the frictional contacts between the element terminals and clips, and means providing access for severing unwanted circuit interconnections.

6. In an electric circuit containing a plurality of unitary independently manufactured circuit elements such as resistors and condensers and circuit interconnections between the elements, a metal mesh generally in the form of a sheet and containing terminals for external connection of the circuit, clips for receiving the terminals of unitary independent circuit elements and circuit interconnections between the mesh terminals and clips, the circuit interconnections being such that the mesh can be handled as a unit with the various parts held in proper relation, some of the interconnections being unwanted in the final circuit but desirable to hold the mesh together for handling, separately manufactured circuit impedance elements having terminals making frictional electric contact with the clips, and flowable plastic molded around and embedding the mesh and elements and the frictional contacts between the element terminals and clips.

7. In an electric circuit containing a plurality of unitary independently manufactured circuit elements such as resistors and condensers and circuit interconnections between the elements, a metal mesh generally in the form of a sheet and containing terminals for external connection of the circuit, clips for receiving the terminals of unitary independent circuit elements and circuit interconnections between the mesh terminals and clips, separately manufactured circuit impedance elements having terminals making frictional electric contact with the clips, and flowable plastic molded around and embedding the mesh and elements and the frictional contacts between the element terminals and clips.

8. In an electric circuit, a metal mesh containing terminals for external connection to the circuit, contacts for engaging the terminal surfaces of unitary leadless circuit elements such as resistors and condensers in the form of bodies with terminal surfaces at the ends of the bodies and circuit interconnections between the terminals and contacts, the metal mesh being generally in the form of a sheet, the circuit interconnections including those necessary for a plurality of different circuits whereby some of the interconnections are unwanted for any particular circuit, and means for severing unwanted circuit interconnections, independent leadless circuit elements having bodies with terminal surfaces at the ends thereof in frictional engagement with the contacts, means cooperating with the circuit elements to hold the terminal surfaces in temporary engagement with the contacts, and flowable plastic consolidated around and in contact with the mesh and circuit elements and the frictional electric contact connections to make connections permanent.

9. In an electric circuit, a general purpose metal mesh containing terminals for external connection to the circuit, contacts for engaging the terminal surfaces of unitary leadless circuit elements such as resistors and condensers in the form of bodies with terminal surfaces at the ends of the bodies and a variety of circuit interconnections between the terminals and contacts, independent leadless circuit elements having bodies with terminal surfaces at the ends thereof in frictional engagement with the contacts, means cooperating with the circuit elements to hold the terminal surfaces in temporary engagement with the contacts, flowable plastic consolidated around and in contact with the mesh and circuit elements and the friction contacts between the element terminals and mesh contacts to make the connections permanent, and openings molded in the plastic providing access to unwanted circuit interconnections.

10. In an electric circuit, a mesh containing a plurality of unitary independently manufactured leadless circuit elements such as resistors and condensers in the form of bodies with terminal surfaces at the ends of the bodies, contacts for engaging the terminal surfaces, and circuit interconnections between the contacts, a temporary electrical connection between one of the terminal surfaces of the elements and one of the contacts comprising parts of the terminal surface and of the engaging contact positioned to engage under light pressure and means cooperating with the one element to maintain the temporary connection, and freely flowable plastic molded around the connection and forced against the parts under heavy pressure in the direction to hold the parts in contact whereby the plastic holds the parts connected.

11. In an electric circuit elements containing a plurality of unitary independently manufactured circuit elements such as resistors and condensers and circuit interconnections between the elements, an electrical connection between one of the terminals of the elements and one of the circuit interconnections comprising a clip on the circuit interconnection frictionally receiving the element terminal, and freely flowable plastic molded around the connection and forced against the clip in the direction to force and hold the clip against the element terminal.

12. A tube socket having a set of pin receiving openings arranged generally in a circle to receive the prongs of a plug-in base carrying a device such as a tube or the like, pin contacts in said openings, a bus radially inward of the pin openings, and leads extending from two of the pin contacts to the bus to provide a cross-over connection therebetween.

13. In an electric circuit, a general purpose mesh having a pair of laterally spaced busses with leads extending outward from each bus away from the other and with terminals extending from each bus toward the other, the terminals from each bus terminating at one of a second pair of busses laterally spaced a lesser distance than the first pair, contacts on the second pair of busses for terminals of previously manufactured circuit elements bridging the space between the busses of the second pair, and cross-over connections bridging the busses of the second pair intermediate the contacts.

14. A tube socket or the like comprising a metal mesh having a circular series of pin contacts arranged to receive the prongs of a plug-in tube base or the like, leads extending radially inward from the contacts to an arcuate bus, the mesh with its pin contacts and circuit interconnection to the bus being generally in the form of a sheet which can be molded as a unit, plastic sheets sandwiching the mesh therebetween and having openings therein through which the bus is accessible to a severing tool at points at which interconnection of the contacts is not desired, and at least two of the contacts being connected to the bus by unsevered leads.

15. A tube socket or the like comprising a metal mesh having a circular series of pin contacts arranged to receive the prongs of a plug-in tube base or the like, leads extending outward from the contacts to make external connections thereto, other leads extending inward from the contacts to an arcuate bus radially within the circular series of pin contacts, the mesh with its pin terminals and circuit interconnections being generally in the form of a sheet which can be molded as a unit, plastic sheets sandwiching the mesh therebetween having openings therein through which the bus is accessible to a severing tool at points at which interconnection of the terminals is not desired, and at least two of the terminals being connected by unsevered leads to an unsevered section of the bus.

16. In an electric circuit, a metal mesh providing circuit interconnections between connections to circuit elements including a circular series of contacts forming a socket for receiving the plug-in prongs of a base carrying a device such as a tube or the like, part of the prongs being connected to parts of the device and part of the prongs being idle or unconnected to parts of the device, and an arcuate bus consisting of part of the mesh located radially within the series of socket contacts and connected to two of the socket contacts, at least one of which engages an idle prong whereby the arcuate bus can provide a cross-over connection in the plane of the socket contacts.

17. In an electric circuit, a metal mesh having an inner ring bus and leads branching radially outward from the bus to a generally circular series of pin contacts forming a socket for receiving the pins of a tube base or the like, the mesh with its terminals, leads and bus being generally in the form of a sheet which can be handled as a unit, plastic consolidated about the mesh, pin receiving openings in the plastic, and openings in the plastic providing access to unwanted portions of the bus and leads whereby selected parts of the bus can be utilized to provide a cross-over connection.

18. A tube socket comprising a body of insulating material apertured to receive the prongs of a tube base or the like, a circular series of contacts within the body and aligned with the apertures for engagement with the tube base prongs, an arcuate bus within the body and radially inward of the contacts, and leads extending radially inward from two of the contacts to the bus to provide a cross-over connection between the contacts.

JEROME D. HEIBEL.

REFERENCES CITED

The following references are of record in the file of this patent:

UNITED STATES PATENTS

| Number | Name | Date |
|---|---|---|
| 1,325,363 | Lindsay | Dec. 16, 1919 |
| 1,691,877 | Alden | Nov. 13, 1928 |
| 1,694,927 | Rice | Dec. 11, 1928 |
| 1,718,993 | Wermine | July 2, 1929 |
| 1,794,831 | Caruso | Mar. 3, 1931 |
| 1,892,146 | Harshberger | Dec. 27, 1932 |
| 1,913,473 | Brennecke | June 13, 1933 |
| 1,938,806 | Butler | Dec. 12, 1933 |
| 1,939,130 | Mills | Dec. 12, 1933 |
| 2,019,625 | O'Brien | Nov. 5, 1935 |
| 2,231,529 | Dey | Feb. 11, 1941 |
| 2,246,933 | Deeley | June 24, 1941 |
| 2,259,740 | Del Camp | Oct. 21, 1941 |
| 2,307,561 | Bailey | Jan. 5, 1943 |
| 2,350,887 | Goff | June 6, 1944 |
| 2,372,929 | Blessing | Apr. 3, 1945 |
| 2,378,801 | Sidell | June 19, 1945 |
| 2,414,604 | Newcombe | Jan. 21, 1947 |
| 2,447,541 | Sabee | Aug. 24, 1948 |
| 2,492,174 | Noble | Dec. 27, 1949 |

FOREIGN PATENTS

| Number | Country | Date |
|---|---|---|
| 201,092 | Great Britain | July 26, 1923 |
| 349,706 | Great Britain | of 1931 |
| 570,877 | Great Britain | of 1945 |

OTHER REFERENCES

The Radio Amateur's Handbook—1945—page 475, published by The American Radio Relay League.